United States Patent Office 3,508,053
Patented Apr. 21, 1970

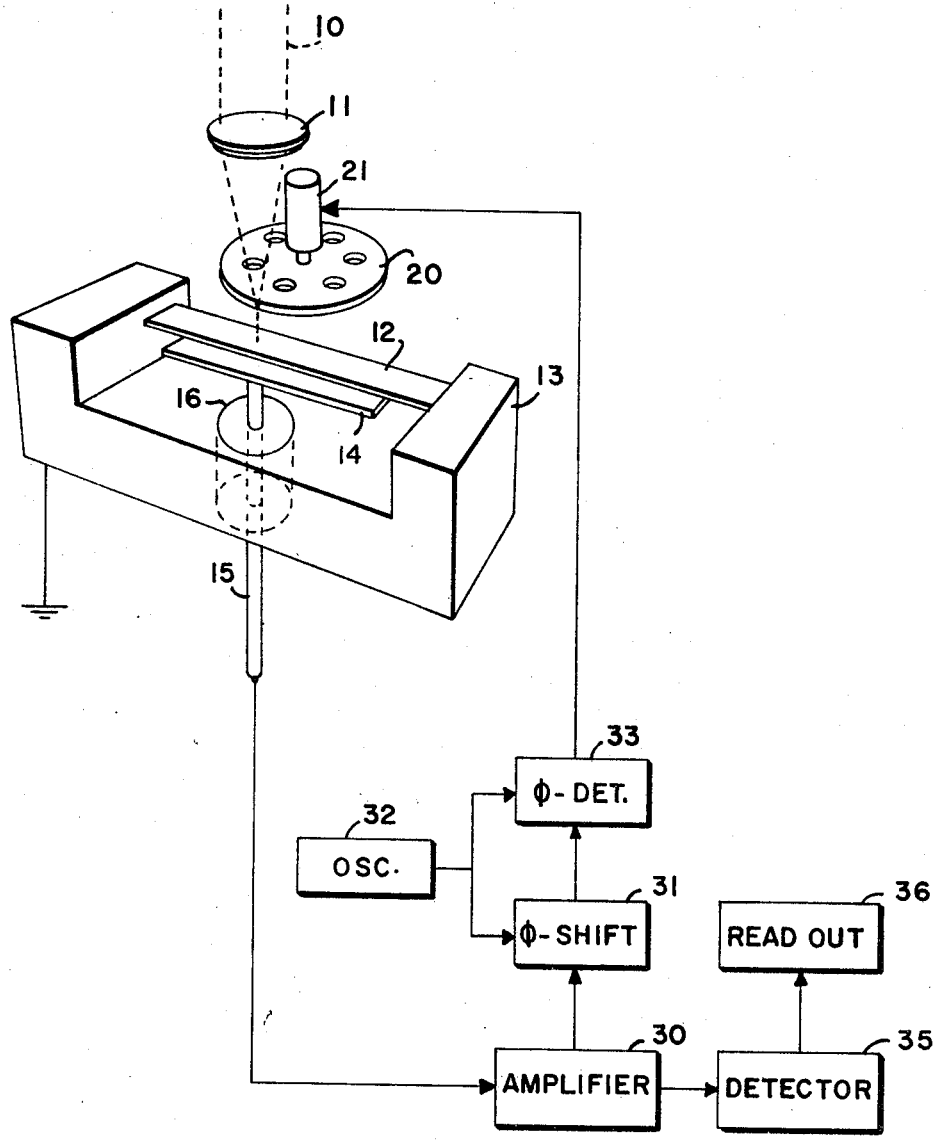

3,508,053
THERMAL DETECTOR OF ELECTROMAGNETIC ENERGY BY MEANS OF A VIBRATING ELECTRODE
John Dimeff, San Jose, Calif., assignor to the United States of America as represented by the Administrator of the National Aeronautics and Space Administration
Filed Mar. 11, 1968, Ser. No. 711,970
Int. Cl. G01t 1/16
U.S. Cl. 250—83                                    2 Claims

ABSTRACT OF THE DISCLOSURE

A thermal detector of electromagnetic energy containing a vibrating ribbon or other member characterized by a natural resonance frequency of vibration or other displacement, and which member is periodically displaced as a result of the periodic heating thereof by electromagnetic energy. A chopping wheel is provided to periodically attenuate any electromagnetic energy which may be incident the displacement member, this periodic attenuation being performed at a resonance frequency of the displacement member for maximum sensitivity. A fixed electrode is capacitively coupled to the displacement structure, and the amplitude of the periodic displacement thereof is sensed by detecting the amplitude of the resulting changes in capacitance between the displacement structure and the fixed electrode, to thereby provide an indication of the power level of any incident radiation. An automatic frequency control system responsive to the amplitude of the periodic displacement of the displacement structure is provided for stabilizing the attenuation frequency of the chopping wheel to a natural resonance frequency of the displacement structure.

BACKGROUND OF THE INVENTION

The invention described herein was made by an employee of the United States Government and may be manufactured and used by or for the Government for governmental purposes without the payment of any royalties thereon or therefor.

The present invention relates in general to the detection of electromagnetic energy, and more particularly to a thermal detector of enhanced sensitivity and reliability.

In bolometers and other thermal detectors previously used to detect small amounts of electromagnetic radiation as a result of heating effects caused by such radiation, the detection is made either by heat-responsive changes in the steady-state values of circuit components, or by heat-responsive changes in the pressure of a confined volume of gas. Such bolometers are of limited sensitivity as a result of electrical noise, instability of supporting structures, and other physical limitations. The best such detectors are characterized by minimum detectable power levels on the order of $10^{-12}$ watts.

An object of the present invention is to overcome these and other limitations of prior art bolometers by the provision of a novel thermomechanical detection system.

SUMMARY OF THE INVENTION

In accordance with the present invention, there is provided: a displacement member having the property that periodic heating thereof by electromagnetic energy results in a periodic displacement in the spatial configuration of said member; means for periodically attentuating any electromagnetic energy which may be incident said displacement member; and means responsive to any resulting periodic displacement of said displacement member for providing an indication of any such incident electromagnetic energy.

DESCRIPTION OF DRAWING

The various features and advantages of the present invention will become more apparent upon a consideration of the following description, taken in connection with the accompanying drawing, wherein the single figure is a partially-schematic perspective view of a detector in accordance with the present invention.

DESCRIPTION OF THE PREFERRED EMBODIMENT

Referring to the drawing, electromagnetic radiation 10, for example at an infrared wavelength, is focused by a lens 11 onto a thin conducting ribbon 12. The ribbon 12 is mounted under tension between opposed arms of a ground support 13, as, for example, by spot welding, swaging, diffusion bonding or the like. An elongated electrode 14 is aligned with, and spaced from, the ribbon 12. The electrode 14 is supported on the end of a lead-in conductor 15 which extends through the bottom of the support member 15 in insulated relation therewith as a result of the interposition of a cylindrical insulating member 16. The beam of radiation 10 focused by the lens 11 is periodically interrupted by a light chopping disc or shutter 20 rotated through the beam by a motor 12.

In operation, the spaced-apart conducting members 12 and 14 form an electrical capacitor, with a capacitance which varies as a function of the spacing between these members. The periodically interrupted radiation beam 10 causes a periodic heating of the ribbon 12, and this, in turn, causes a periodic variation in the spacing, and hence, capacitance, between the members 12 and 14. The amplitude of this periodically varying capacitance can then be detected to provide a sensitive indication of the power level of the incident radiation 10.

For maximum sensitivity, it is desirable to interrupt the beam 10 at the fundamental natural resonance frequency of vibration of the ribbon 12, or at a harmonic of this frequency. To accomplish this, the capacitance formed by the conducting members 12 and 14 is connected to the input of an electronic amplifier 30 which has an A-C output which duplicates, at an amplified level, the periodic variations in said capacitance. One output of the amplifier 30 is fed to a phase shift network 31 which is modulated by a relatively low frequency local oscillator 32, to produce an alternating phase shift at this low frequency on the output of the amplifier 30. The alternating phase output of the phase shift network 31 is then compared in a phase sensitive detector 33 with a reference signal from the local oscillator 32, to thereby generate a D-C control signal which is applied to the chopper motor 21 in order to vary the speed at which the chopper disc 20 is rotated. In accordance with well-known principles of automatic frequency control, if the ribbon 12 is vibrating at a resonance frequency (either fundamental or harmonic), a condition of maximum response is attained whereby the alternating phase shift introduced by the modulated phase shifter 31 causes equal attenuation on both half-cycles of the modulation and thus no output is generated by the phase detector 33. If however, the vibration frequency of the ribbon 12 begins to drift from the resonance frequency, an output is generated by the phase detector 21 with a polarity which depends on the direction of the drift. Accordingly, the output of the phase detector 33 is used to vary the speed of the chopper 20 so as to reduce said output to zero, thereby stabilizing the rotation of the disc 20 at that speed for which the beam 10 is interrupted at a resonance frequency of the ribbon 12. A second output of the amplifier 30 is fed to a detector 35 to generate a signal which varies in accordance with the amplitude of the capacitance variations at the input to the amplifier 30. Thus this signal may be used to drive a suitable read-out device 36, such as a meter or a recorder, to provide an indication of the power level of the incident radiation 10.

An approximate calculation of the sensitivity of this device may be made by expressing the radiation power W incident on the ribbon 12 by the relationship:

(1) $$W = W_0 \sin^2\left(\frac{t}{\tau_v}\right)$$

where:

$t$ represents time;
$W_0$ is the rate at which uninterrupted energy is incident the chopper 20; and
$1/\tau_v$ is the angular frequency at which the chopper 20 interrupts the beam 10.

Upon opening of the chopper 20, the ribbon 12 will absorb energy for a period of time $\tau_t$, after which the energy conducted through the ribbon 12 to the ground support 13 will be approximately equal to that supplied by the incident radiation. This time may be related to the characteristics of the ribobn 12 by the equation:

(2) $$\tau_t = \frac{\rho c S^2}{4\pi k}$$

where:

$\rho$ is the density of the ribbon 12;
$c$ is the specific heat of the ribbon 12;
S is the length of the ribbon 12; and
$k$ is the specific heat of ribbon 12.

If, however, the beam interruption period $\tau_v$ is much less than $\tau_t$, as given by Equation 2, then the incident radiation would be accept over only the shorter interval $\tau_v$. In general, the following relationship may be used to express an effective energy acceptance interval $\tau_e$:

(3) $$\tau_e = \frac{\tau_v \tau_t}{\tau_v + \tau_t}$$

The energy accepted by the ribbon is then $\tau_e W$, and this can be set equal to the increase $\Delta T \rho c V$ in the thermal energy of the ribbon, where V is the volume of the ribbon and $\Delta T$ in the resultant rise in the temperature of the ribbon. Thus, the following expression for the temperature rise $\Delta T$ is derived:

(4) $$\Delta T = \frac{\tau_e W}{\rho c V}$$

The increase in temperature will cause an expansion $\Delta S$ in the length S of the ribbon 12 from an initial length $S_0$. Since a ribbon deflected under a uniform force assumes an approximately sinusoidal shape, the extension in length $\Delta S$ can be geometrically related to the deflection $y$ of the central portion of the ribbon from the initial position by the formula:

(5) $$\frac{\Delta S}{S_0} = \frac{\pi^2 y^2}{4 S_0^2}$$

From considerations of thermal expansion, the fractional expansion $\Delta S/S_0$ is related to the temperature increase $\Delta T$ by the formula;

(6) $$\Delta S/S_0 = \alpha \Delta T$$

where:

$\alpha$ is the temperature coefficient of expansion of the ribbon 12.

The ribbon 12, being periodically disturbed by the radiation of the beam 10, will develop a net displacement Y which is larger than the displacement $y$ of a single disturbance by a resonator quality factor Q, the factor Q being equal to the ratio of energy stored in the ribbon 12 to the energy it dissipates per angular cycle of its displacement. That is:

(7) $$y = Y/Q$$

Combining Equations 3, 4, 5, 6, and 7, the following relationship is obtained:

(8) $$W = \frac{\pi^3 A k}{\alpha}\left[1 + \frac{\tau_t}{\tau_v}\right]\frac{Y^2}{Q^2 S_0^3}$$

Referring to Equation 8, it is the displacement Y which gives rise to the detected signal in accordance with the present invention. In the particular embodiment shown in the drawing, changes in Y are measured by changes in the capacitance between the member 12 being displaced and a reference electrode 14. However, as will be apparent to those skilled in the art, other displacement detecting devices can be used, including, for example, optical, inductive, strain gauge or momentum transfer devices. In regard to a choice of material for the ribbon 12, higher sensitivity (higher displacement Y for a given input W) is obtained by materials with a high $\alpha/k$ ratio. A typical list of materials, in descending order or $\alpha/k$ ratio at 20° K., is: lead, indium, zinc, silver, aluminum, iron, nickel and copper. Some typical values which may be substituted in Equation 8 for a ribbon made of lead at 20° K. are: $k = 0.6$ watts/cm.—° K.; $\alpha = 1.1 \times 10^{-5}$ ° K$^{-1}$; $A = 10^{-5}$ cm.$^2$; and $Q = 10^4$. In accordance with readily available techniques, a minimum measurable displacement Y may be taken as $10^{-8}$ cm. Then, under conditions wherein $$\left[1 + \frac{\tau_t}{\tau_v}\right] \simeq 1$$

the theoretical value of W required to achieve this minimum measurable displacement Y is $2 \times 10^{-24}$ watts. Since measurements in accordance with the present invention are made without limitations introduced by the effects of Johnson noise and without the introduction of problems related to the electrical heating induced by measuring circuits, and since thermal fluctation noise is not generally a limiting factor until significantly lower power levels are encountered, a significant advance in the art of thermal detection is achievable by the use of the present invention.

For enhanced operation, it is desirable to place the ribbon structure shown in the drawing in a reduced temperature and pressure environment in accordance with well known cryogenic techniques. This can be accomplished by placing the device in a simple Dewar flask. In particular, it is desirable to reduce the environmental pressure to $10^{-5}$ mm. or less to avoid air damping of the vibrating ribbon 12.

Certain modifications, in addition to those already discussed, will now be apparent to those skilled in the art, of which the following are examples. The vibrating ribbon 12 may be replaced by a vibrating wire or membrane, or by a cantilever beam, or by other structure in which periodic heating may be used to distort the structure at or near a resonance frequency. Alternative techniques for driving such structures would include introducing a steady force which provides an initial displacement, and modulating the radiation at the fundamental resonance frequency, or at some other harmonic of that frequency. Moreover, the vibrating structure could be used to provide inputs to a feedback control system which modifies an initial heating, an initial drive, an initial damping or other property so as to maintain a constant condition, or to adjust the operating condition so as to obtain such desirable features as controlled bandwidth, selected linear or non-linear response, expanded range and the like.

Having thus described my invention what I claim as new and desire to protect by Letters Patent is:

1. A thermal detector of electromagnetic energy, comprising:

a displacement member having the property that periodic heating thereof by electromagnetic energy results in vibration in the spatial configuration of said member, said member being an end supported ribbon with a natural resonance frequency for said vibration;

means for periodically attenuating, at a frequency substantially equal to said resonance frequency, any electromagnetic energy which may be incident said displacement member; and means responsive to any resulting vibration of said displacement member for providing an indication of any such incident electromagnetic energy.

2. A thermal detector according to claim 1, further comprising means responsive to said displacement responsive means for automatically stabilizing said attenuation frequency to said resonance frequency.

References Cited

UNITED STATES PATENTS

| 2,435,519 | 2/1948 | Tolson | 250—83 |
| 2,951,942 | 9/1960 | Kramish | 250—83.1 |
| 3,014,129 | 12/1961 | Martin | 250—43.5 |
| 3,268,735 | 8/1966 | Beeh | 250—83.3 X |

RALPH G. NILSON, Primary Examiner

D. L. WILLIS, Assistant Examiner

U.S. Cl. X.R.

250—83.3